(12) United States Patent
Harada et al.

(10) Patent No.: US 8,488,305 B2
(45) Date of Patent: Jul. 16, 2013

(54) ELECTRONIC DEVICE AND CAP

(75) Inventors: Kurumi Harada, Kawasaki (JP);
Takashi Suzuki, Kawasaki (JP); Kouki Murakami, Kawasaki (JP); Takeshi Komuro, Kawasaki (JP); Hiroshi Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 218 days.

(21) Appl. No.: 13/180,162

(22) Filed: Jul. 11, 2011

(65) Prior Publication Data
US 2012/0063073 A1    Mar. 15, 2012

(30) Foreign Application Priority Data

Sep. 10, 2010    (JP) ................. 2010-203731

(51) Int. Cl.
*G06F 1/16* (2006.01)

(52) U.S. Cl.
USPC ....... 361/679.02; 455/401; 248/454; 166/338

(58) Field of Classification Search
USPC ............. 455/577, 575.1, 575.5, 67.11, 401, 455/405; 248/220.22, 288.11, 309.1, 349.1, 248/475.1, 454, 222.11; 710/13, 109, 74; 361/797, 798, 801, 807, 679.31, 679.32, 361/679.02, 679.6, 679.4, 679.33, 679.48; 403/83, 27, 345, 381; 312/348, 348.4, 330.1, 312/111, 221, 222, 109, 107.5, 219, 247, 312/321, 215, 218; 166/381, 85.5, 380, 382, 166/378, 336, 338; 345/1.3, 903, 905, 173, 345/31

See application file for complete search history.

(56) References Cited

U.S. PATENT DOCUMENTS

2009/0149219 A1 *   6/2009   Rhee et al. ............... 455/557
2010/0218670 A1 *   9/2010   Keng ..................... 89/37.04

FOREIGN PATENT DOCUMENTS

| JP | 07-235881 A | 9/1995 |
|----|-------------|--------|
| JP | 11-168787 A | 6/1999 |
| JP | 2006-114300 A | 4/2006 |
| JP | 2007-084640 A | 4/2007 |

* cited by examiner

*Primary Examiner* — Hung Duong
(74) *Attorney, Agent, or Firm* — Westerman, Hattori, Daniels & Adrian, LLP (57) ABSTRACT

An electronic device has a cap protecting an opening disposed in a case. The cap includes a base portion covering the opening, a leg portion extended from a part of the base portion; an attachment portion having a large diameter surface that has a diameter larger than the diameter of the leg portion and includes a connecting region that connects with the leg portion at the end of the leg portion opposite to the base portion, and a protruding portion protruding from a region other than the connecting region of the large diameter surface of the attachment portion.

4 Claims, 10 Drawing Sheets

ELECTRONIC DEVICE AND CAP

CROSS-REFERENCE TO RELATED APPLICATIONS

This application is related to and claims priority to Japanese Patent Application No. 2010-203731 filed on Sep. 10, 2010, the entire contents of which are herein incorporated by reference.

BACKGROUND

1. Field

The present invention relates to an electronic device and a cap.

2. Description of the Related Art

Hitherto, a mobile terminal such as a mobile phone has various terminals, interfaces, and so forth at arbitrary positions in the case of the mobile terminal. For example, a mobile terminal has a terminal used for charging, a USB (Universal Serial Bus) terminal used for data communication with an external device, and an interface for connecting to an external device using a standard such as HDMI (High-Definition Multimedia Interface). Some mobile terminals have a housing portion that houses a medium such as a memory card.

The case of such a mobile terminal having terminals, interfaces, housing portions, and so forth is sometimes provided with a cap covering the terminals, interfaces, and housing portions, for the purpose of protection, dust proofing, and waterproofing. Such a cap is provided not only in a mobile terminal but also at an arbitrary position in various electronic devices.

Figure 6A:
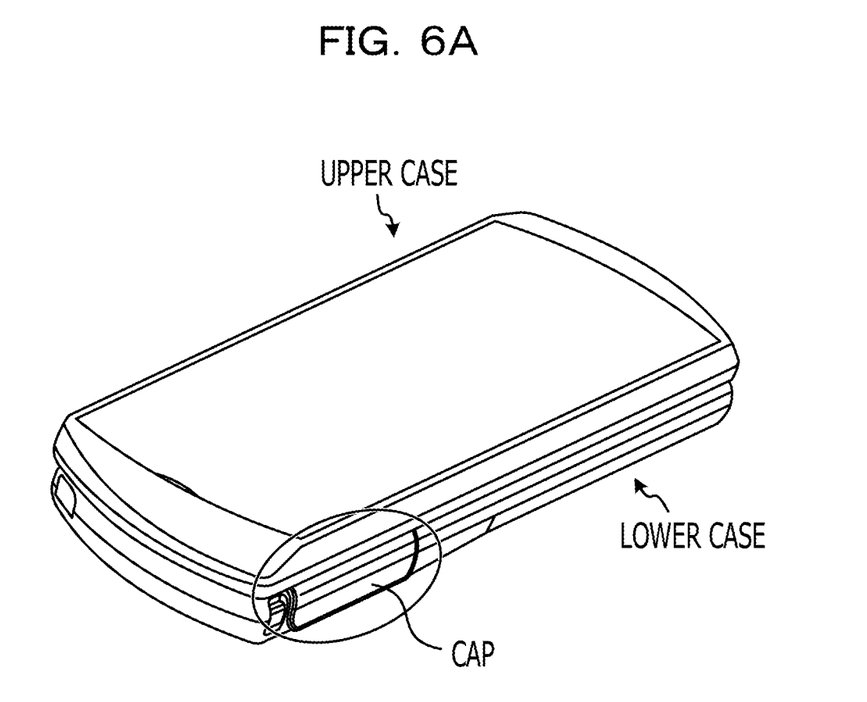
FIG. 6A is a perspective view of a mobile terminal according to the prior art.
Figure 6B:
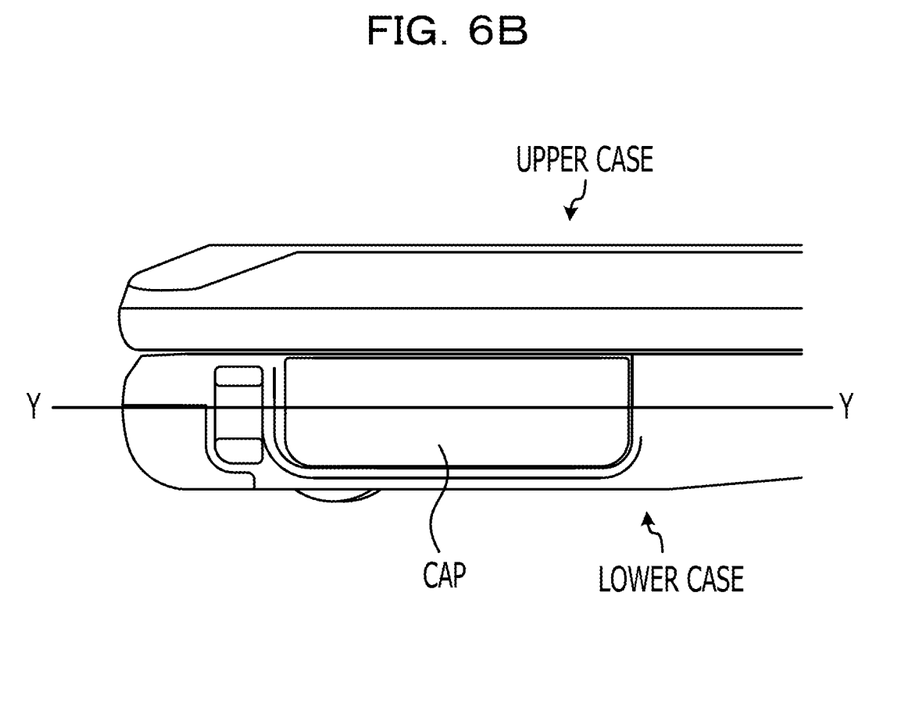
FIG. 6B is an enlarged view of the part surrounded by an ellipse in FIG. 6A.
Figure 6C:
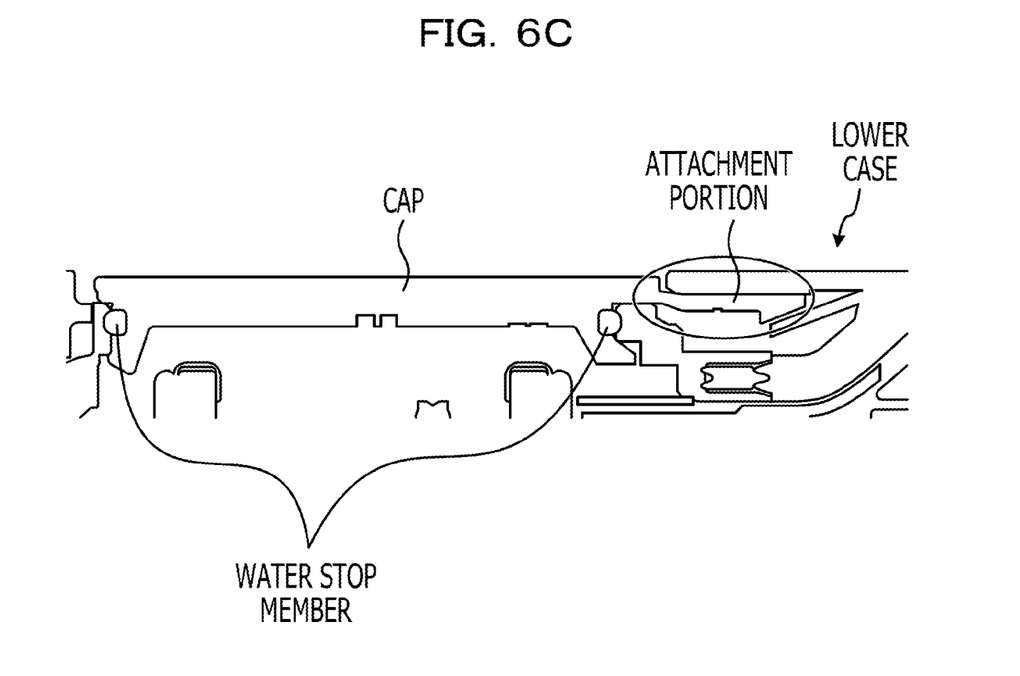
FIG. 6C is a sectional view taken along line Y-Y of FIG. 6B.

With reference to FIGS. 6A to 6C and FIG. 7, the cap structure of a mobile terminal according to the prior art will be described. FIG. 6A is a perspective view of a mobile terminal according to the prior art. FIG. 6B is an enlarged view of the part surrounded by an ellipse in FIG. 6A. FIG. 6C is a sectional view taken along line Y-Y of FIG. 6B.

For example, as illustrated in FIGS. 6A and 6B, the mobile terminal has an upper case (UPPER CASE) having a display and so forth, and a lower case (LOWER CASE) having operation keys, terminals, interfaces, housing portions, and so forth. To the lower case, a cap (CAP) is attached that covers the terminals, interfaces, housing portions, and so forth. Such a cap has, as illustrated in the part surrounded by an ellipse in FIG. 6C, for example, such a structure that an attachment portion (ATTACHMENT PORTION) is extended in the longitudinal direction of the lower case (LOWER CASE), so as not to easily come off the lower case. In addition, as described above, the cap (CAP) has a water stop member (WATER STOP MEMBER) for waterproofing at an arbitrary position.

Such a structure, in which an attachment portion is extended, prevents space-saving when pluralities of terminals, interfaces, housing portions, and so forth are mounted on a mobile terminal. So, recently, there has been a cap structure for achieving space-saving.

Figure 7:
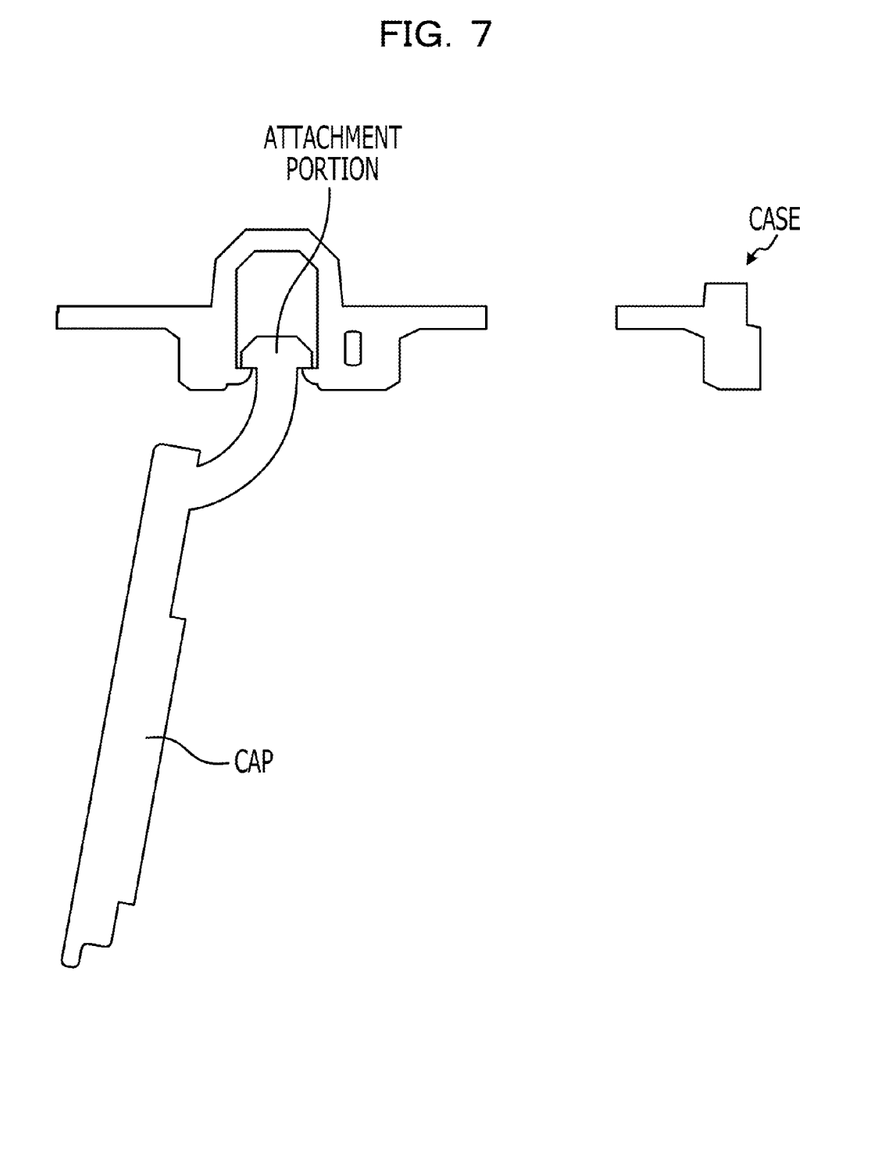
FIG. 7 illustrates an example of a cap structure according to the prior art.

With reference to FIG. 7, another example of a cap structure according to the prior art will be described. FIG. 7 illustrates an example of a cap structure according to the prior art. For example, as illustrated in FIG. 7, a cap (CAP) has a protrusion-like attachment portion (ATTACHMENT PORTION) as an alternative to the part surrounded by an ellipse in FIG. 6C, and has such a structure that the attachment portion is engaged with a case (CASE).

Literature on the above includes Japanese Laid-open Patent Publication Nos. 2006-114300, 11-168787, 2007-84640, and 7-235881.

SUMMARY

It is an aspect of the embodiments discussed herein to provide an electronic device has a cap protecting an opening disposed in a case. The cap includes: a base portion covering the opening; a leg portion extended from a part of the base portion; an attachment portion having a large diameter surface that has a diameter larger than the diameter of the leg portion and includes a connecting region that connects with the leg portion at the end of the leg portion opposite to the base portion; and a protruding portion protruding from a region other than the connecting region of the large diameter surface of the attachment portion.

The object and advantages of the invention will be realized and attained by AT LEAST the elements, FEATURES, and combinations particularly pointed out in the claims.

It is to be understood that both the foregoing general description and the following detailed description are exemplary and explanatory and are not restrictive of the invention, as claimed.

DETAILED DESCRIPTION OF THE EMBODIMENTS

In the prior art, it is impossible to achieve both the space-saving of cap structure and the prevention of coming-off of a cap. For example, in the structure of a cap having a protrusion-like attachment portion for space-saving, shortening the attachment portion makes the coming-off of the cap from the case more likely. Therefore, in the prior art, it is impossible to achieve both the space-saving of cap structure and the prevention of coming-off of a cap.

So, the art disclosed below provides an electronic device and a cap capable of achieving both the space-saving of cap structure and the prevention of coming-off of a cap.

An electronic device disclosed below includes a cap protecting an opening disposed in a case. The cap has a base portion covering the opening, a leg portion extended from a part of the base portion, an attachment portion having a large diameter surface that has a diameter larger than the diameter of the leg portion and includes a connecting region that connects with the leg portion at the end of the leg portion opposite to the base portion, and a protruding portion protruding from a region other than the connecting region of the large diameter surface of the attachment portion. The case has a coming-off preventing portion that is disposed at a narrowed entrance part of a hole provided in the case and that engages with the attachment portion and prevents coming-off, and a housing portion including the coming-off preventing portion and capable of housing the attachment portion in a space in the case of the hole.

An embodiment of an electronic device and a cap disclosed below can achieve both the space-saving of cap structure and the prevention of coming-off of a cap.

An embodiment of an electronic device and a cap will be described with reference to the drawings. The present invention is not limited by the following embodiment. In the following description, a mobile terminal such as a mobile phone will be taken as an example of an electronic device.

Figure 1:
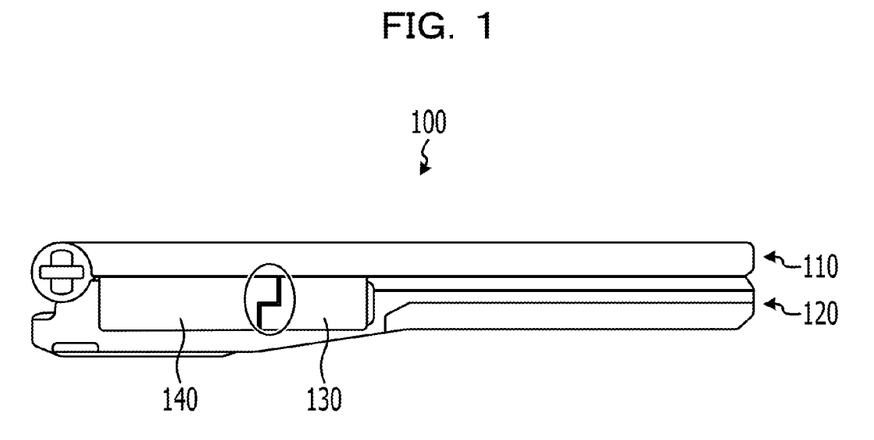
FIG. 1 illustrates an example of the attachment position of a cap to a mobile terminal according to an embodiment.

[Attachment position of cap] With reference to FIG. 1, the attachment position of a cap to a mobile terminal according to this embodiment will be described. FIG. 1 illustrates an example of the attachment position of a cap to a mobile terminal according to this embodiment.

For example, as illustrated in FIG. 1, a mobile terminal 100 has a first case 110 and a second case 120. The second case 120 is provided with caps 130 and 140 that protect openings. The mobile terminal 100 may be a folding mobile terminal illustrated in FIG. 1 or a sliding mobile terminal.

The first case 110 has, for example, a display, an earpiece, and so forth. The second case 120 has, for example, various operation keys, a mouthpiece, a battery case, and at least one opening corresponding to terminals, interfaces, housing portions that house media, and so forth. In FIG. 1, there are two openings.

The caps 130 and 140 protect, for example, openings disposed in the second case 120. The caps 130 and 140 are disposed, for example, as illustrated in the part surrounded by an ellipse in FIG. 1, in such a manner that one ends thereof share an arbitrary surface of the second case 120. The shared part is used for attaching the caps 130 and 140 to the second case 120.

Figure 2:
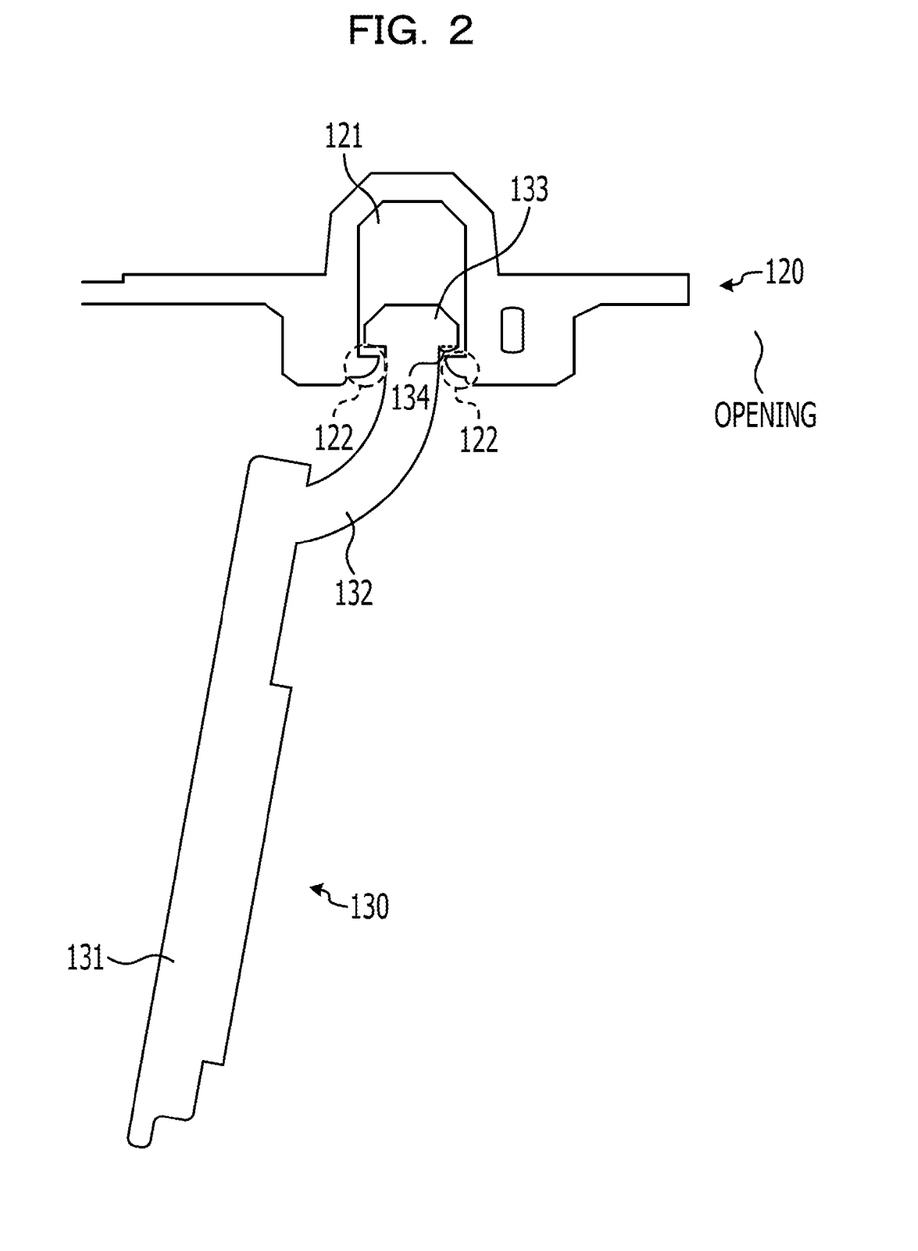
FIG. 2 illustrates an example of the structure of a case and a cap according to an embodiment.

[Structure of case and cap] Next, with reference to FIG. 2, the structure of a case and a cap according to this embodiment will be described. FIG. 2 illustrates an example of the structure of a case and a cap according to this embodiment. In FIG. 2, of the caps 130 and 140 having the same structure, the cap 130 will be taken as an example of a cap.

For example, as illustrated in FIG. 2, the second case 120 has a housing portion 121 having a coming-off preventing portion 122. The housing portion 121 is disposed, for example, in the vicinity of an opening of the second case 120, and has a hole at one end thereof. The coming-off preventing portion 122 is disposed, for example, near the hole provided at one end of the housing portion 121, and has such a structure that the size of the hole is narrower than the space in the housing portion 121.

The cap 130 has, for example, a base portion 131, a leg portion 132, an attachment potion 133, and a protruding portion 134, and is made of an elastic material such as elastomer. The base portion 131 covers, for example, an opening disposed in the second case 120. The leg portion 132 is extended, for example, from a part of the base portion 131, and at least a part of the leg portion 132 can be housed in the housing portion 121.

The attachment portion 133 engages, for example, with the coming-off preventing portion 122, is disposed at the end of the leg portion 132 opposite to the base portion 131, and can be housed in the housing portion 121. The attachment portion 133 has a large diameter surface that has a diameter larger than the diameter of the leg portion 132 and includes a connecting region that connects with the leg portion 132. The protruding portion 134 is disposed, for example, on a part of a surface where the attachment portion 133 is in contact with the coming-off preventing portion 122, and has a protruding shape. In one embodiment, when an opening is protected by the cap 130, such a protruding portion 134 is disposed on a part of a surface where the attachment portion 133 is in contact with the coming-off preventing portion 122, in the direction of the opening protected by the cap 130. That is, the protruding portion 134 protrudes from a region other than the connecting region of the large diameter surface of the attachment portion 133.

Figure 3:
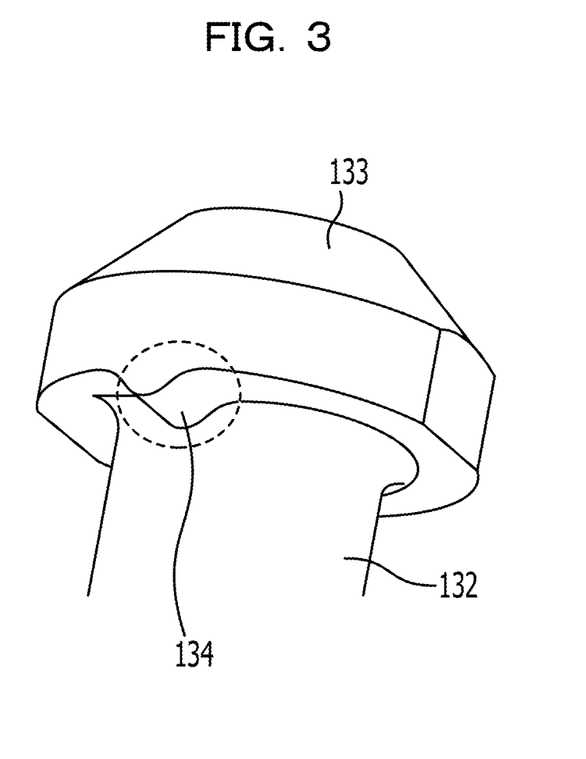
FIG. 3 illustrates an example of the shape of a protruding portion according to an embodiment.

[Shape of protruding portion] Next, with reference to FIG. 3, the shape of a protruding portion 134 according to this embodiment will be described. FIG. 3 illustrates an example of the shape of a protruding portion 134 according to this embodiment.

For example, as illustrated in FIG. 3, the protruding portion 134 has a protruding shape substantially symmetrical with respect to the circumferential direction of the surface where the attachment portion 133 is in contact with the coming-off preventing portion 122, and slopes from the most protruding part of the protruding shape to both circumferential directions. The protruding portion 134 does not necessarily have to have the protruding shape illustrated in FIG. 3, and may be, for example, a part of a sphere such as a hemisphere or a part of a polyhedron having at least a predetermined number of vertexes.

Figure 4:
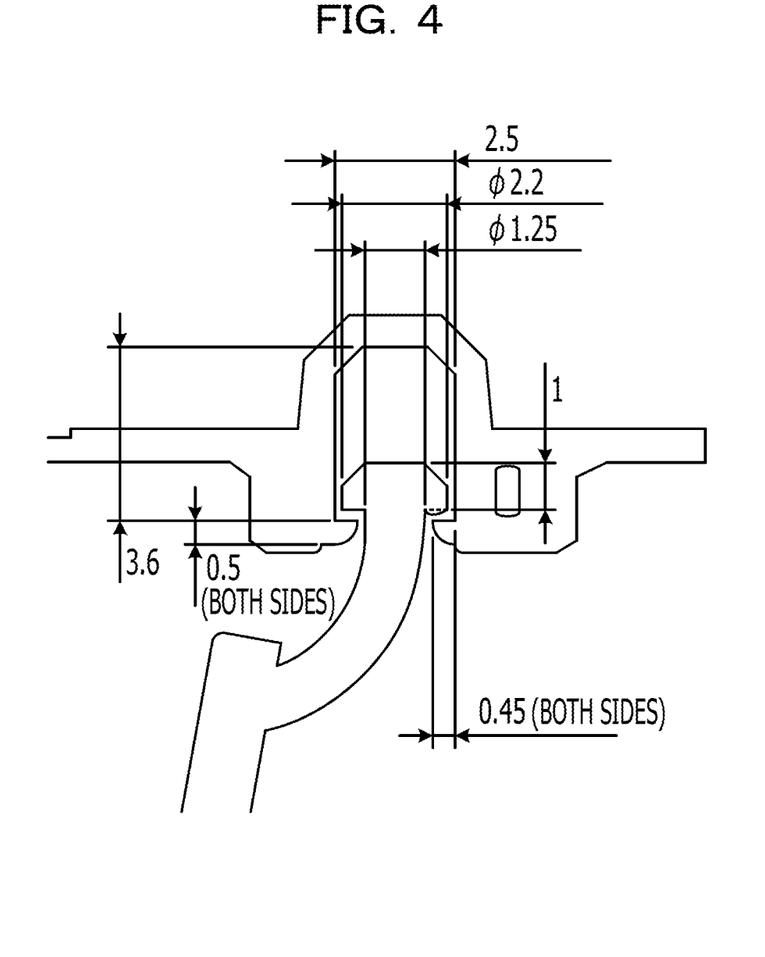
FIG. 4 illustrates an example of the sizes of a case and a cap according to an embodiment.

[Sizes of case and cap] Next, with reference to FIG. 4, the sizes of a case and a cap according to this embodiment will be described. FIG. 4 illustrates an example of the sizes of a case and a cap according to this embodiment.

For example, as illustrated in FIG. 4, in the housing portion 121 of the second case 120, the size from the entrance of the hole to the position where the coming-off preventing portion 122 is in contact with the attachment portion 133, in the direction from the cap 130 to the first case 110, is "0.5 millimeters." For example, in the housing portion of the second case 120, the size from the position where the coming-off preventing portion 122 is in contact with the attachment portion 133 to the position closest to the first case 110 in the space of the housing portion 121, in the direction from the cap 130 to the first case 110, is "3.6 millimeters."

For example, in the housing portion 121 of the second case 120, the size of the coming-off preventing portion 122 in the direction from the opening to the cap 140 is "0.45 millimeters." Similarly, for example, in the housing portion 121 of the second case 120, the size of the coming-off preventing portion 122 in the direction from the cap 140 to the opening is "0.45 millimeters." In the housing portion 121 of the second case 120, the size of the widest part of the space of the housing portion 121 in the direction from the opening to the cap 140 is "2.5 millimeters."

For example, in the attachment portion 133 of the cap 130, the size of the widest part of the attachment portion 133 in the direction from the opening to the cap 140 is "2.2 millimeters in diameter." For example, in the cap 130, the size of the leg portion 132 in the direction from the opening to the cap 140 is "1.25 millimeters in diameter." For example, in the attachment portion 133 of the cap 130, the size from the position where the coming-off preventing portion 122 is in contact with the attachment portion 133 to the position closest to the first case 110 in the attachment portion 133, in the direction from the cap 130 to the first case 110, is "1 millimeter."

Figure 5A:
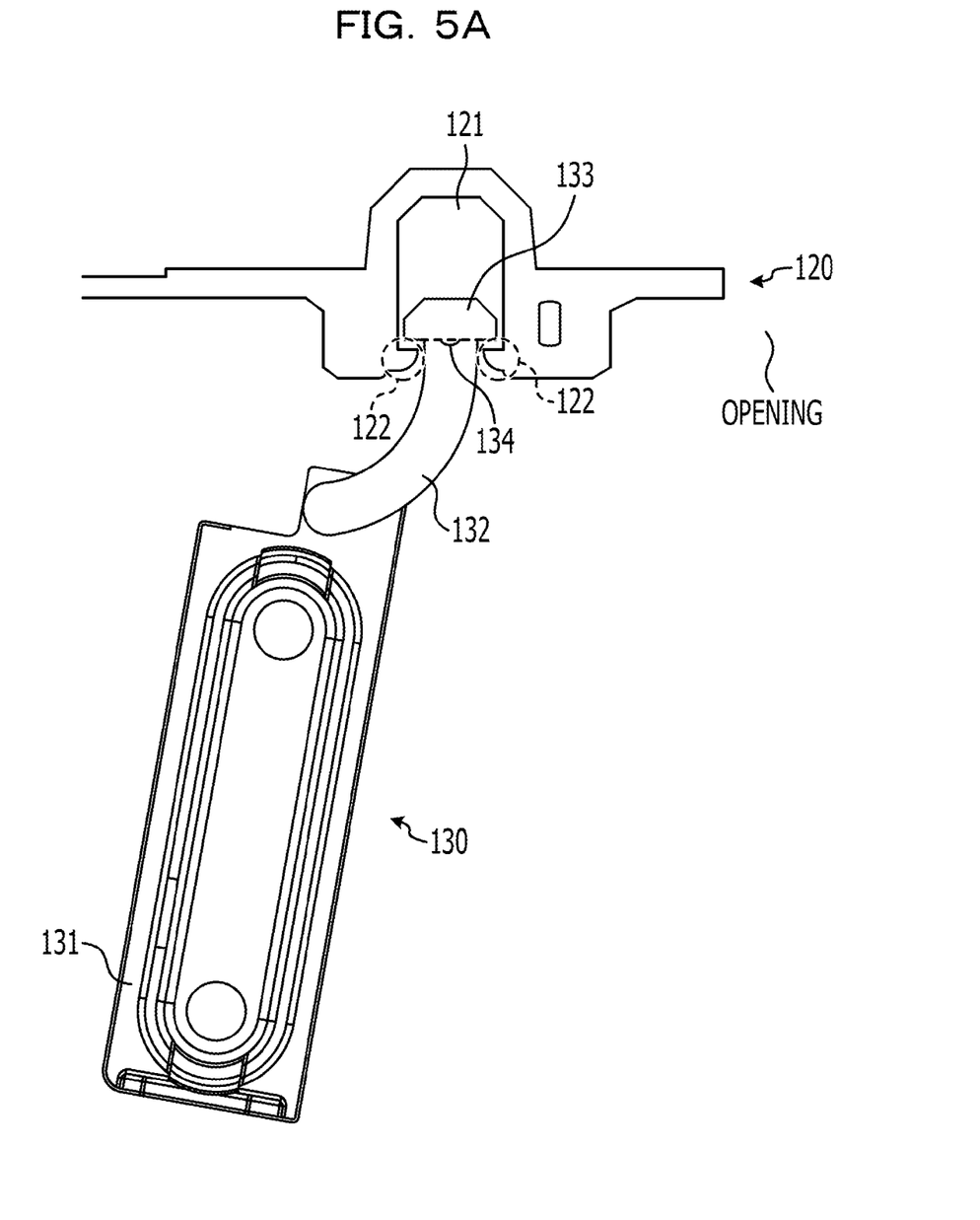
FIG. 5A illustrates the behavior of a cap according to an embodiment being pulled out of a case.
Figure 5B:
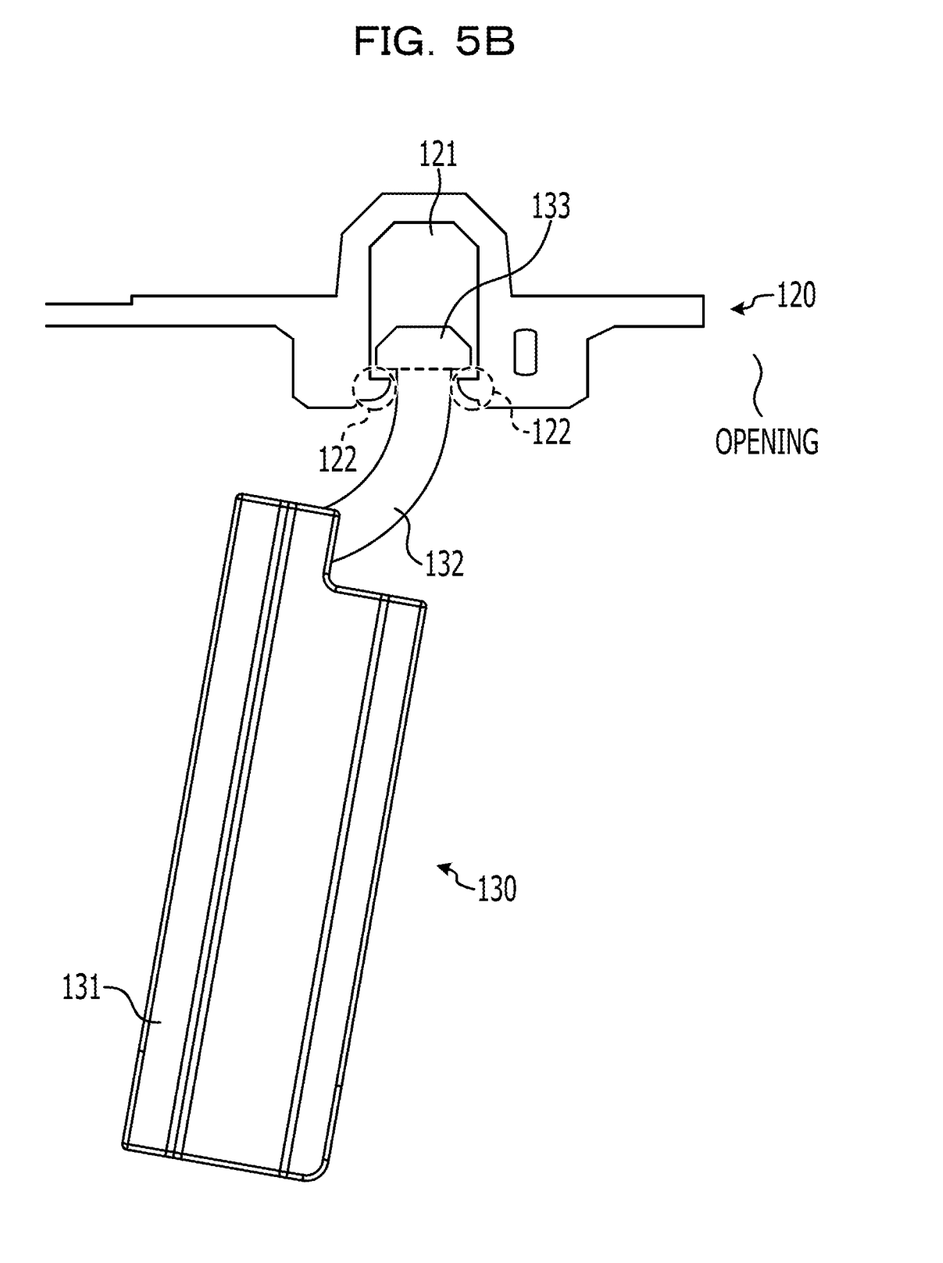
FIG. 5B illustrates the behavior of a cap according to an embodiment being pulled out of a case.

[Rotation of cap] Next, with reference to FIGS. 5A and 5B, the behavior of a cap according to this embodiment being pulled will be described. FIGS. 5A and 5B illustrate the behavior of a cap according to this embodiment being pulled. In the following, a description will be given of the behavior of the cap 130 when a pulling force in the direction of the cap 140 is applied to the cap 130 in the state illustrated in FIG. 2 where the cap 130 is moving away from the opening toward the cap 140.

For example, when a pulling force in the direction of the cap 140 is applied to the cap 130 in the state illustrated in FIG. 2, the point of application of force on the protruding portion 134, which is made of elastomer, moves from the most protruding part to the sloping part. When the point of application of force moves to the sloping part, the cap 130 rotates in an arbitrary direction. When the cap 130 rotates by substantially 90 degrees from the original position of the protruding portion 134, the cap 130 is as illustrated in FIG. 5A. When the cap 130 rotates by substantially 270 degrees, the cap 130 is as illustrated in FIG. 5B. In FIG. 5B, the protruding portion 134 is located on the opposite side from the position of the protruding portion 134 illustrated in FIG. 5A. The rotation direction is sometimes a rotation direction opposite to the rotation direction illustrated in FIGS. 5A and 5B. That is, the rotation direction changes depending on the point of application of force when the cap 130 is pulled. In other words, when the cap 130 is pulled, the point on the protruding portion 134 in contact with the coming-off preventing portion 122 is moved, and thereby the base portion 131 is also moved.

When the protruding portion 134 is a part of a sphere such as a hemisphere or a part of a polyhedron having at least a predetermined number of vertexes, the protruding portion 134 is deformed by applying external force because the protruding portion 134 is made of elastomer. When a predetermined force is applied, the point of application of force leaves the protruding portion 134. That is, when the protruding portion 134 is a part of a sphere such as a hemisphere or a part of a polyhedron having at least a predetermined number of vertexes, the point of application of force leaves the protruding portion 134, and the cap 130 is thereby rotated in an arbitrary direction.

[Advantageous effects of embodiments] As described above, the cap 130 of the mobile terminal 100 shares an arbitrary surface of the second case 120 with the cap 140, at one end of the cap 130, and the shared part is used for attaching the caps 130 and 140 to the second case 120. The cap 130 of the mobile terminal 100 has a protruding portion 134 on a part of a surface where the attachment portion 133 that can be housed in the housing portion 121 of the second case 120 is in contact with the coming-off preventing portion 122. That is, the cap 130 shares the part of attachment with another cap, and thereby the space-saving of the cap structure can be achieved. When the cap 130 is pulled by an external force, the point of application of force moves from the protruding part to the sloping part and the cap 130 rotates in an arbitrary direction, and thereby the cap can be prevented from easily coming off.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. An electronic device comprising a cap protecting an opening disposed in a case,
    wherein the cap includes:
    a base portion covering the opening;
    a leg portion extended from a part of the base portion;
    an attachment portion having a large diameter surface that has a diameter larger than the diameter of the leg portion and includes a connecting region that connects with the leg portion at the end of the leg portion opposite to the base portion; and
    a protruding portion protruding from a region other than the connecting region of the large diameter surface of the attachment portion, and
    the case includes:
    a coming-off preventing portion that is disposed at a narrowed entrance part of a hole provided in the case and that engages with the attachment portion and prevents coming-off; and
    a housing portion including the coming-off preventing portion and capable of housing the attachment portion in a space in the case of the hole.

2. The electronic device according to claim 1, wherein when the base portion is pulled in an arbitrary direction away from the case with at least a predetermined force, the point on the protruding portion in contact with the coming-off preventing portion is moved, and thereby the base portion is also moved.

3. The electronic device according to claim 1, wherein when a plurality of the caps protect a plurality of openings of the case, the housing portion is disposed in a part within a predetermined range of an arbitrary surface of the case.

4. A cap protecting an opening disposed in a case, the cap comprising:
    a base portion covering the opening;
    a leg portion extended from a part of the base portion;
    an attachment portion having a large diameter surface that has a diameter larger than the diameter of the leg portion and includes a connecting region that connects with the leg portion at the end of the leg portion opposite to the base portion; and
    a protruding portion protruding from a region other than the connecting region of the large diameter surface of the attachment portion.

* * * * *